United States Patent
Schaff et al.

(10) Patent No.: US 8,107,380 B1
(45) Date of Patent: Jan. 31, 2012

(54) SYSTEM AND METHOD FOR OPERATING A COMMUNICATION SYSTEM

(75) Inventors: Jonathan E. Schaff, San Leandro, CA (US); Kuncheng Richard Yang, Fremont, CA (US); Cory A. Yang, Fremont, CA (US); John Tayag Susbilla, Milpitas, CA (US); Quang Ba Doan, Roseville, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 160 days.

(21) Appl. No.: 12/512,431

(22) Filed: Jul. 30, 2009

(51) Int. Cl.
*G06F 11/00* (2006.01)

(52) U.S. Cl. ........................ 370/238; 370/401

(58) Field of Classification Search ............... 370/389, 370/238, 352, 401; 709/238, 242; 455/445
See application file for complete search history.

(56) References Cited

U.S. PATENT DOCUMENTS

| | | | |
|---|---|---|---|
| 7,590,074 B1 * | 9/2009 | Dondeti et al. | 370/254 |
| 7,821,935 B2 * | 10/2010 | Park et al. | 370/230.1 |
| 2010/0293297 A1 * | 11/2010 | Perumal et al. | 709/245 |

* cited by examiner

*Primary Examiner* — Ricky Ngo
*Assistant Examiner* — Chandrahas Patel

(57) ABSTRACT

A method for operating a communication system is provided. The method includes monitoring traffic within a communication network to determine a traffic volume, and determining a routing table update rate based on the traffic volume. The method also includes receiving a routing table update, and updating a routing table using the routing table update at a time based on the routing table update rate.

15 Claims, 5 Drawing Sheets

SYSTEM AND METHOD FOR OPERATING A COMMUNICATION SYSTEM

TECHNICAL BACKGROUND

In communication systems routing tables are used to direct communication traffic to the correct end system. When a new end system is connected to a communication network, or an existing end system is re-located within the communication network, routing table updates are generated and distributed in order to update system router tables to include the revised routing information for the end system.

Typically, when an update is performed within a remote processing system, the remote processing system is temporarily unable to direct traffic within its associated communication network. As the frequency of router table updates increases, the interruptions in service to the communication network increase.

Overview

In various embodiments, methods and systems are provided for operating a communication system. In an embodiment, a method for operating a communication system is provided. The method includes monitoring traffic within a communication network to determine a traffic volume, and determining a routing table update rate based on the traffic volume. The method also includes receiving a routing table update, and updating a routing table using the routing table update at a time based on the routing table update rate.

In a further embodiment, a communication system is provided. The communication system includes a remote processing system and a remote processing system management system. The remote processing system is coupled to a communication network, and configured to determine a traffic volume within the communication network, determine a routing table update rate based on the traffic volume, receive a routing table update, and translate the routing table update into a routing table. The remote processing system management system is coupled to the remote processing system, and configured to receive the routing table update rate from the remote processing system, receive a routing table update, and transmit the routing table update to the remote processing system at a time based on the routing table update rate.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1A:
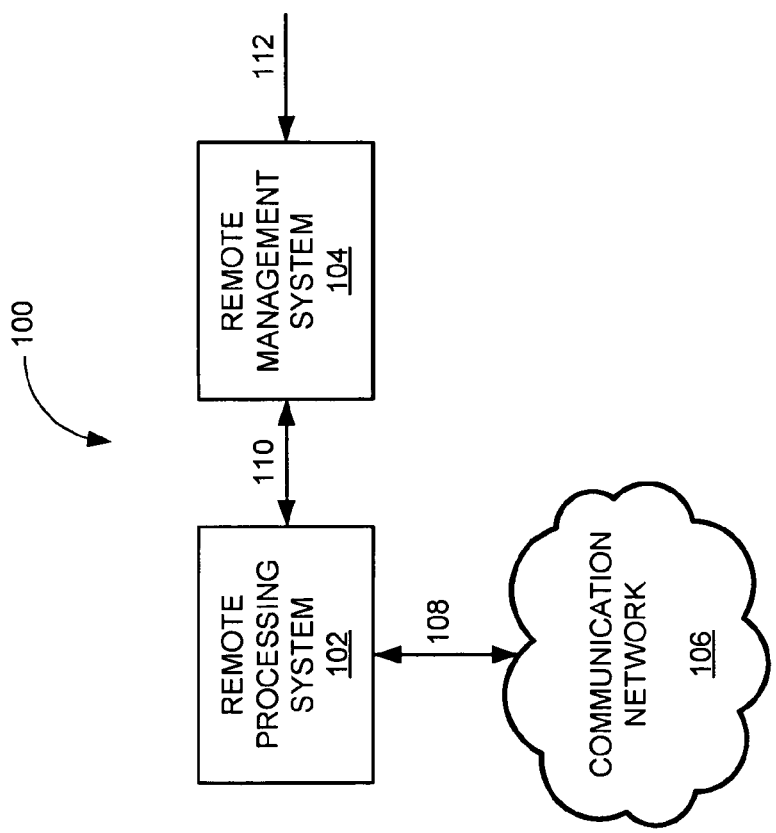
FIGS. 1A and 1B are block diagrams illustrating a communication system.

FIG. 1A is a block diagram illustrating communication system 100. This example communication system 100 includes remote processing system 102, remote management system 104 and communication network 106. Remote processing system 102 is coupled with communication network 106 by link 108, and with remote management system 104 by link 110.

Remote processing system 102 may be any system capable of storing routing tables for use with communication network 106 and updating the routing tables as necessary. Routing tables are used by remote processing system 102 and communication network 106 to route traffic correctly to various end systems (not shown for clarity). When new end systems are added to the system, or existing end systems are reconfigured, the routing tables must be updated to reflect their new locations. Routing table updates 112 are received by remote management system 104, where they are stored until remote processing system 102 is ready to receive the update.

Communication network 106 may be any type or combination of types of networks configured to transfer communications from a source device to a destination device, such as a packet or TDM (time division multiplexing) network. These communications may include voice, data, video, audio, or the like. Communication network 106 may include a wide variety of systems and devices such as links, switches, routers, gateways, session border controllers, or the like, used to route communications from the source device to the destination device.

In an example, when a source device desires to send traffic to a destination device, it may have a 1-800 number of the destination device. In such an example, remote processing system 102 includes a router table configured to translate the 1-800 number into routing instructions allowing communication network 106 to route the call from the source device to the destination device.

Links 108 and 110, along with links within communication network 106, may use any of a variety of communication media, such as air, metal, optical fiber, or any other signal propagation path, including combinations thereof. Further, the links could be direct links or they might include various intermediate components, systems, and networks. In some examples, link 110 may be a cable or wire between a rack-mounted remote processing system 102 and a rack-mounted remote management system 104.

In this example communication system 100, remote management system 104 receives a routing table update 112. This routing table update 112 may be in any of a wide variety of formats and be received from any of a wide variety of sources. When the routing table within remote processing system 102 is updated, the routing table is temporarily unavailable for a short time to route traffic within communication network 106. While it is desirable to update the routing table whenever any end system is added, or changes configuration, such frequent updates may disrupt traffic within communication network 106.

In this example, remote processing system 102 is configured to monitor traffic levels within communication network 106. Remote processing system 102 then determines a routing table update rate based on the traffic levels. When traffic levels are low, the routing table may be updated at a faster rate without disrupting traffic within communication network 106. When traffic levels are high, the routing table may be updated at a lower rate to avoid disrupting traffic within communication network 106.

In some embodiments, remote processing system 102 signals remote management system 104 when it is ready to receive updated routing data. Remote management system 104 then transfers a routing table update to remote processing system 102 over link 110. Once it receives the routing table update, remote processing system 102 updates its internal routing table to reflect the changes included in the routing table update.

In some embodiments, Remote management system 104 receives routing table updates in a format different from that used by remote processing system 102. In such an embodiment, remote management system 104 translates the routing table update into a format usable by remote processing system 102 before transferring the routing table update to remote processing system 102. In other embodiments, remote management system 104 may transfer the routing table update in its original format, and remote processing system 102 may perform the translation of the routing table update into a usable format.

In some embodiments, remote processing system 102 receives routing table updates from remote management system 104 as they are generated. However, remote processing system 102 only processes the received updates at the previously determined update rate. In further embodiments, remote processing system 102, remote management system 104, and link 110 may be incorporated into a single system performing the functions of remote processing system 102 and remote management system 104 as described above. In such an embodiment, link 110 may be as simple as a printed circuit board trace between devices containing remote processing system 102 and remote management system 104.

Figure 1B:
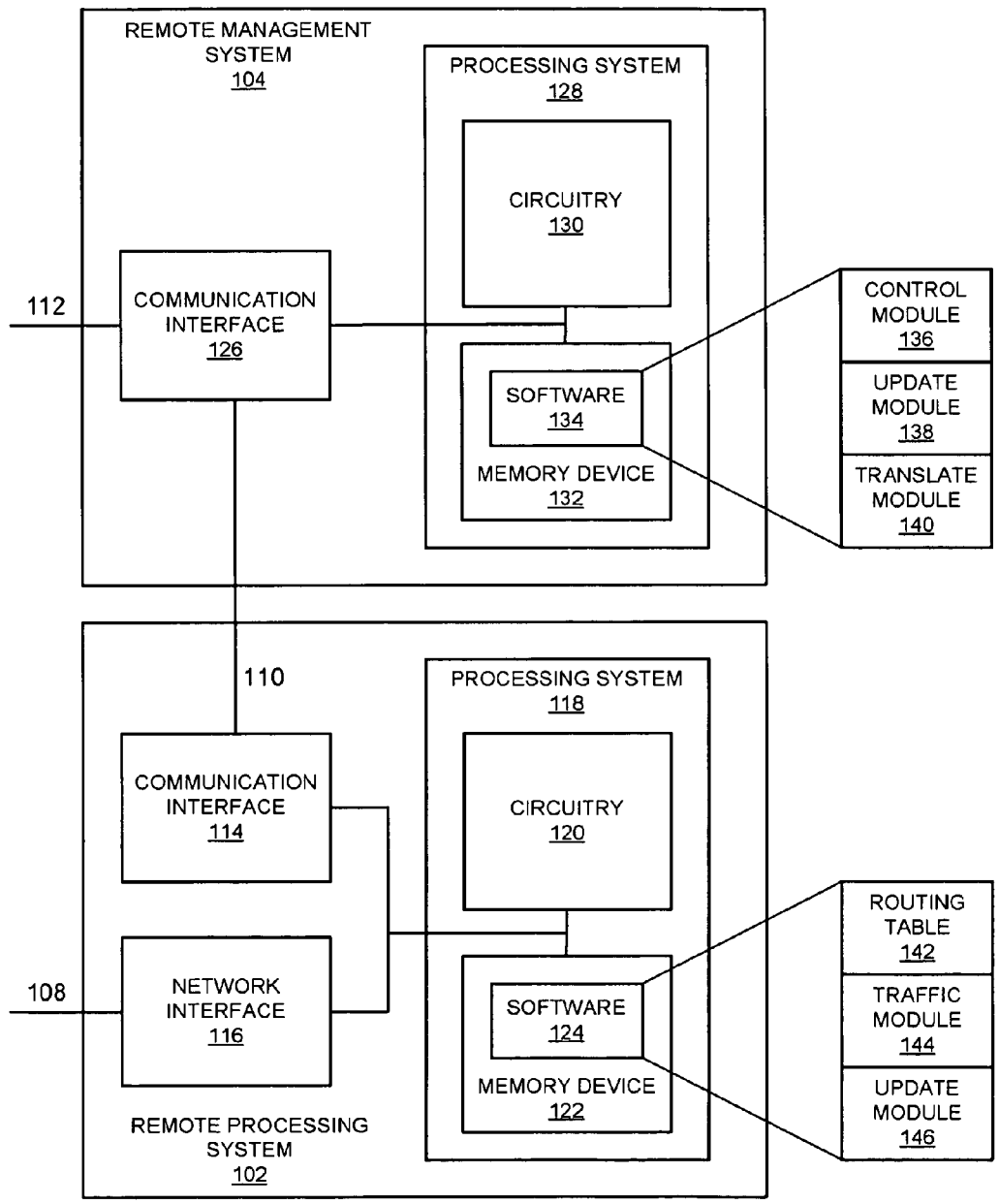

FIG. 1B is a block diagram illustrating a portion of communication system 100 from FIG. 1A in further detail. In this example embodiment, remote processing system 102 includes communication interface 114, network interface 116, and processing system 118. Processing system 118 includes processing circuitry 120 and memory device 122. Software 124 including routing table 142, traffic module 144, and update module 146, is contained within memory device 122. Remote processing system 102 communicates with communication network 106 through link 108.

Remote management system 104 includes communication interface 126 and processing system 128. Processing system 128 includes circuitry 130 and memory device 132. Software 134 including control module 136, update module 138, and translate module 140, is contained within memory device 132. Remote management system receives routing table updates 112 through communication interface 126, and communicates with remote processing system 102 through link 110.

In this example, traffic module 144 directs processing system 118 to determine the level of traffic within communication network 106. This determination may be made in any number of different ways. For example, remote processing system 102 may receive data from a gateway or session border controller about the amount of traffic within communication network 102, or it may simply determine the rate at which it receives requests for routing information and use that data in determining the amount of network traffic.

Update module 146 then determines a routing table update rate based on the amount of network traffic. It also directs processing system 118 to communicate with remote management system 104 through communication interface 113 and over link 110 and to schedule the transfer of routing table updates from remote management system 104 to remote processing system 102.

Control module 136 of remote management system 104 directs processing system 128 to receive routing table updates 112 through communication interface 126. Translate module 140 then directs processing system 128 to translate the routing table update into a format usable by remote processing system 102. Update module 138 directs processing system 128 to communicate with remote processing system 102 through communication interface 126 and over link 110 to schedule the transfer of routing table updates from remote management system 104 to remote processing system 102.

When remote processing system 102 receives a routing table update from remote management system 104 over link 110, update module 146 controls processing system 118 to update routing table 142 with the new routing information. This updated routing table 142 is then ready to direct traffic within communication network 106 by sending routing instructions through network interface 116 and link 108 to communication network 106.

Figure 2:
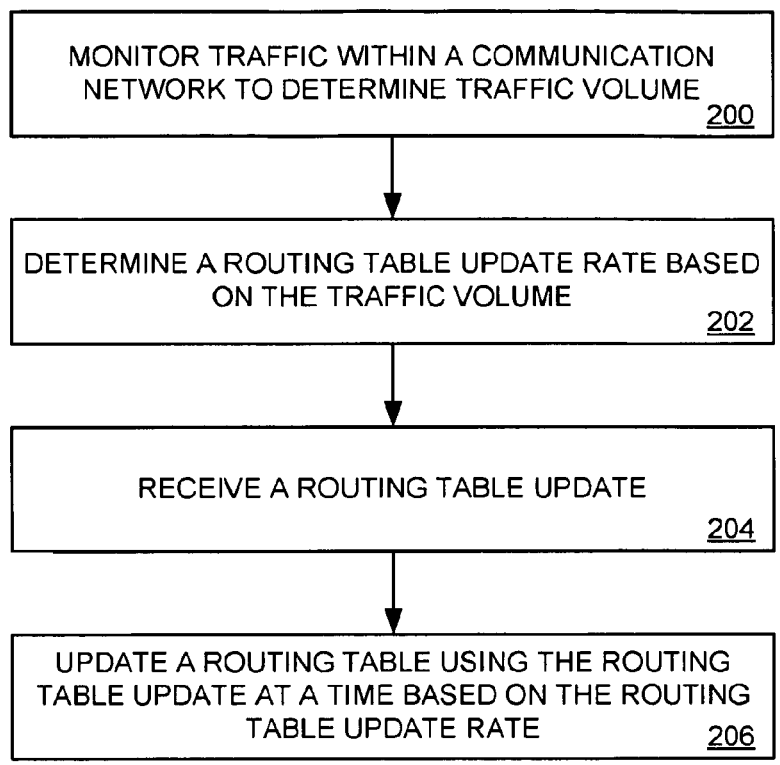
FIG. 2 is a flow chart illustrating a method of operating a communication system.

FIG. 2 is a flow chart illustrating a method of operating communication system 100. In this example method, remote processing system 102 monitors traffic within communication network 106 to determine traffic volume within communication network 106 (operation 200). This monitoring of traffic may be performed by any of a variety of systems and methods. For example, the traffic within communication network 106 may be monitored by a switch, gateway, a session border controller, or the like. In other examples, remote processing system 102 may determine the rate at which it is receiving routing requests from communication network 106, and use this rate in determining the volume of network traffic. Remote processing system 102 then determines a routing table update rate based on the traffic volume (operation 202).

Remote processing system 102 receives a routing table update from remote management system 104 over link 110 (operation 204). Remote processing system 102 then updates its routing table using the routing table update at a time based on the routing table update rate (operation 206). As described above, remote processing system 102 and remote management system 104 may be incorporated into a single device which performs the functions of both systems.

Figure 3:
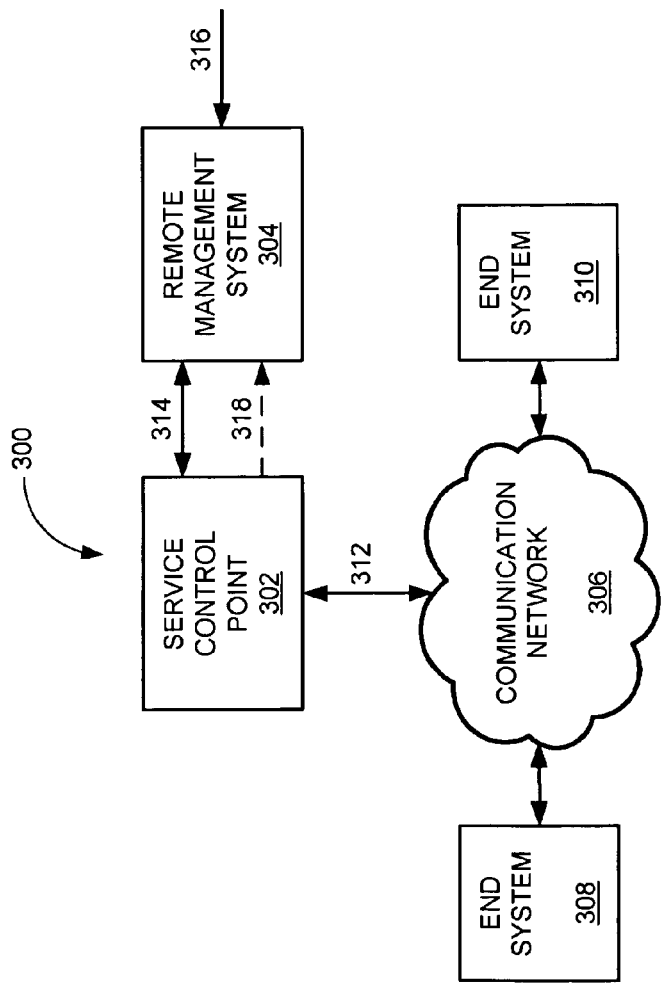
FIG. 3 is a block diagram illustrating a communication system.

FIG. 3 is a block diagram illustrating communication system 300. This example communication system 300 includes service control point (SCP) 302, remote management system 304, communication network 306, end system 308, and end system 310. Service control point 302 is coupled to communication network 306 by link 312, and with remote management system 304 by links 314 and 318.

Communication network 306 may be any type or combination of types of networks configured to transfer communications from a source device to a destination device, such as a packet or TDM (time division multiplexing) network. These communications may include voice, data, video, or the like. Communication network 306 may include a wide variety of systems and devices such as links, switches, routers, gateways, session border controllers, or the like, used to route communications from the source device to the destination device.

In an example, when a source device desires to send traffic to a destination device, it may have a 1-800 number of the destination device. In such an example, service control point 302 includes a router table configured to translate the 1-800 number into routing instructions allowing communication network 306 to route the call from the source device to the destination device.

Links 312, 314, and 318 may use any of a variety of communication media, such as air, metal, optical fiber, or any other signal propagation path, including combinations thereof. Further, the links could be direct links or they might include various intermediate components, systems, and networks.

In this example, end system 308 and end system 310 communicate with each other via traffic through communication network 306. When the configuration or location of end system 310 changes, an update to the routing table contained within service control point 302 is required to direct traffic within communication network 306 to the correct destination. A routing table update 316 is received by remote management system 304, which then stores the update until service control point 302 is ready to receive the update. As described above, service control point 302 monitors the traffic within communication network 306 in order to determine a traffic volume, and to determine a routing table update rate based on the traffic volume. This monitoring may occur within a switch, gateway, a session border controller, or the like associated with communication network 306. In some examples the traffic volume may be determined by calculating how busy service control point 302 is with fielding routing queries from communication network 306.

Service control point 302 determines a time for the update based on the routing table update rate calculated earlier. This update time may be determined by determining a delay period based on the routing table update rate, determining a time of a previous update of the routing table, and adding the delay period to the time of the previous update of the routing table.

When it is time for an update, service control point 302 signals remote management system 304 over link 318. In response, remote management system 304 transfers a routing table update to service control point 302 over link 314. Service control point 302 then updates the routing table to reflect the changes contained within the routing table update. In various embodiments, service control point 302 may update some or all of the routing table. The signaling described above may be performed by service control point 302 asserting a control signal over link 318 at an update time when it is ready to receive a routing table update. When the control signal is asserted, remote management system then transfers a routing table update to service control point 302 over link 314.

In some embodiments service control point 302 may determine the update time by determining a delay period based on the routing table update rate, determining a time of a previous update of the routing table, and adding the delay period to the time of the previous update of the routing table.

In some embodiments, remote management system 304 may receive a plurality of routing table updates 316 while waiting for service control point 302 to signal that it is ready for an update. In such a case, remote management system 304 may either merge the plurality of routing table updates 316 into a single routing table update for transfer to service control point 302, or it may transfer the plurality of routing table updates to service control point 302 where they each are applied to the routing table.

The methods, systems, devices, processors, equipment, and servers described above may be implemented with, contain, or be executed by one or more computer systems. The methods described above may also be stored on a computer readable medium for execution by a computer system. Many of the elements of communication systems 100 and 300 may be, comprise, or include computer systems. This includes, but is not limited to: remote processing system 102, remote management system 104, service control point 302, and remote management system 304. These computer systems are illustrated, by way of example, in FIG. 4.

Figure 4:
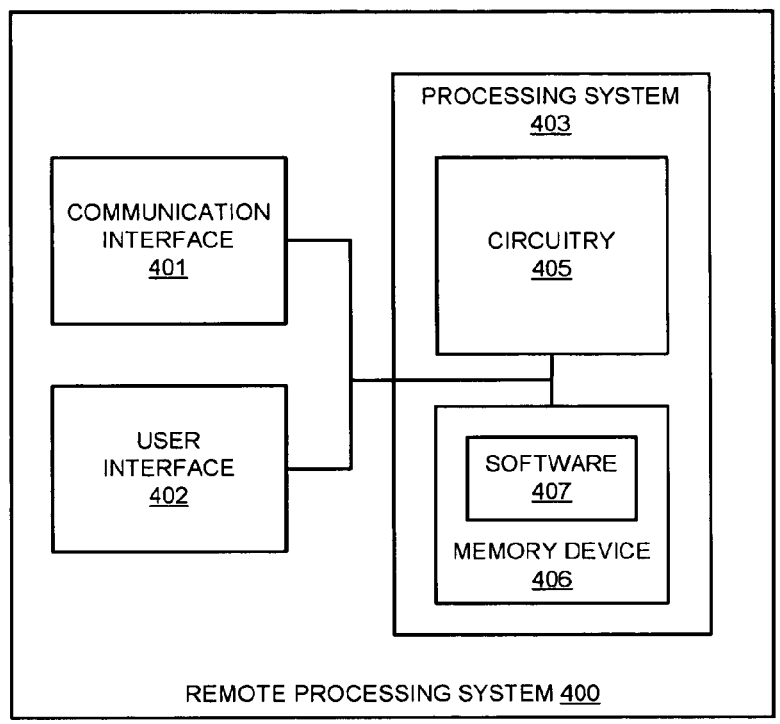
FIG. 4 is a block diagram illustrating a remote processing system.

FIG. 4 illustrates remote processing system 400. Remote processing system 400 is an example of remote processing system 102 or service control point 302, although remote processing system 102 and service control point 302 may use alternative configurations. Remote processing system 400 includes communication interface 401, user interface 402 and processing system 403. Processing system 403 is linked to communication interface 401 and user interface 402. Processing system 403 includes processing circuitry 405 and memory device 406 that stores operating software 407.

Communication interface 401 includes components that communicate over communication links, such as network cards, ports, RF transceivers, processing circuitry and software, or some other communication devices. Communication interface 401 may be configured to communicate over metallic, wireless, or optical links. Communication interface 401 may be configured to use TDM, IP, Ethernet, optical networking, wireless protocols, communication signaling, or some other communication format—including combinations thereof.

User interface 402 includes components that interact with a user. User interface 402 may include a keyboard, display screen, mouse, touch pad, or some other user input/output apparatus. User interface 402 may be omitted in some examples.

Processing circuitry 405 includes microprocessor and other circuitry that retrieves and executes operating software 407 from memory device 406. Memory device 406 comprises a disk drive, flash drive, data storage circuitry, or some other memory apparatus. Operating software 407 comprises computer programs, firmware, or some other form of machine-readable processing instructions. Operating software 407 may include an operating system, utilities, drivers, network interfaces, applications, or some other type of software. In this example, operating software 407 contains instructions directing processing system 403 to monitor traffic within a communication network to determine an amount of traffic, determine a routing table update rate based on the amount of traffic, receive a routing table update, and to update a routing table at a time based on the routing table update rate.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for operating a communication system comprising:
    monitoring traffic within a communication network to determine a traffic volume;
    determining a routing table update rate based on the traffic volume;
    receiving a routing table update;
    determining a delay period based on the routing table update rate;
    determining a time of a previous update of the routing table;
    adding the delay period to the time of the previous update of the routing table to identify an update time; and
    updating a routing table using the routing table update at the update time.

2. The method of claim 1 further comprising:
    translating the routing table update from a first format into a second format.

3. The method of claim 1 wherein the traffic within the communication network is monitored at a gateway.

4. The method of claim 1 wherein the traffic within the communication network is monitored at a session border controller.

5. The method of claim 1 wherein the routing table update is configured to trigger an update of a subset of the routing table.

6. The method of claim 1 wherein the routing table update is configured to trigger an update of all of the routing table.

7. A communication system comprising:
- a remote processing system coupled to a communication network, configured to determine a traffic volume within the communication network, determine a routing table update rate based on the traffic volume, receive a routing table update, determine a delay period based on the routing table update rate, determine a time of a previous update of the routing table, add the delay period to the time of the previous update of the routing table to identify an update time, and update a routing table using the routing table update; and
- a remote management system coupled to the remote processing system, configured to receive the routing table update rate from the remote processing system, receive a routing table update, and transmit the routing table update to the remote processing system at the update time.

8. The communication system of claim 7,
wherein the remote management system is configured to receive a plurality of routing table updates, combine the plurality of routing table updates into a single combined routing table update, and transfer the combined routing table update to the remote processing system at a time based on the routing table update rate.

9. The communication system of claim 7,
wherein the remote management system is configured to translate the routing table update from a first format into a second format.

10. The communication system of claim 7 wherein the traffic within the communication network is monitored at a gateway.

11. The communication system of claim 7 wherein the traffic within the communication network is monitored at a session border controller.

12. The communication system of claim 7 wherein the remote processing system is configured to update a subset of the routing table.

13. The communication system of claim 7 wherein the remote processing system is configured to update all of the routing table.

14. The communication system of claim 7,
wherein the remote processing system is configured to transmit a control signal to the remote management system when the routing table may be updated.

15. The communication system of claim 14,
wherein the remote management system is configured to transfer a routing table update to the remote processing system when the control signal is asserted.

* * * * *